C. A. Frederick,
Potato Masher.

No. 112,577.  Patented Mar. 14, 1871.

WITNESSES.
INVENTOR.
C. A. Frederick
per Munn & Co.
ATTORNEYS.

United States Patent Office.

CHARLES ADOLPH FREDERICK, OF SAN FRANCISCO, CALIFORNIA.

Letters Patent No. 112,577, dated March 14, 1871.

IMPROVEMENT IN POTATO-MASHERS.

The Schedule referred to in these Letters Patent and making part of the same.

*To all whom it may concern:*

Be it known that I, CHARLES ADOLPH FREDERICK, of San Francisco, in the county of San Francisco and State of California, have invented a new and improved Potato-Masher; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
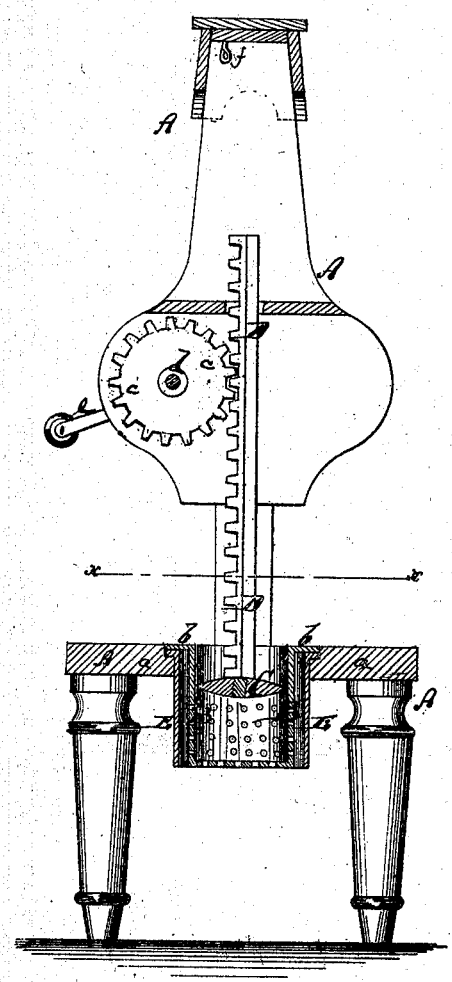
Figure 1 represents a vertical central section of my improved potato-masher.
Figure 2:
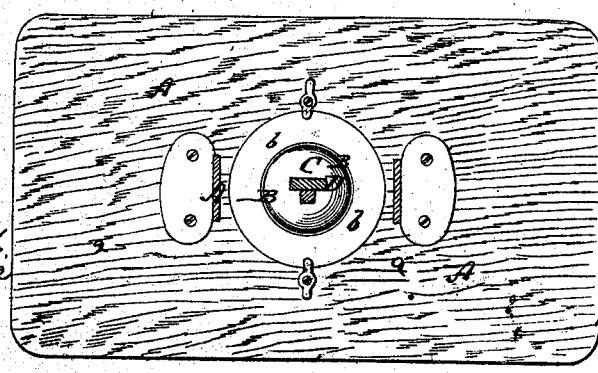
Figure 2 is a horizontal section of the same taken on the plane of the line $x$ $x$, fig. 1.

This invention relates to a new instrument for thoroughly mashing potatoes and other fruit or vegetable substances, and consists in the construction and arrangement of parts, as hereinafter described.

A in the drawing represents the frame of my improved masher.

It is provided with an aperture in the bed-plate $a$, in which a cylindrical sieve or perforated vessel, B, having also a perforated bottom, is suspended.

The vessel B has an outwardly-projecting flange, $b$, at its upper end, whereby it is suspended from the bed, as shown.

C is a plunger, shaped to fit the vessel B, and suspended from a rack, D, which is guided in the upper part of the frame A.

A toothed wheel, $c$, mounted upon an arbor, $d$, meshes into the teeth of the rack D, and serves to move the plunger up or down whenever the crank $e$ of the arbor is revolved.

A spring catch, $f$, may be secured to the frame for holding the plunger elevated whenever it is desired to remove, clean, or repair the vessel B.

The fruit to be mashed is, peeled or unpeeled, placed into the vessel B, and the plunger then worked down to crush the same and to force the crushed particles through the pores of the vessel, while the skins and other indigestible parts remain in the latter.

An annular jacket, E, is suspended from the plate $a$, to surround the vessel B, so as to prevent the crushed matter from being scattered.

Having thus described my invention,

I claim as new and desire to secure by Letters Patent—

The cylinder B, having perforated sides and bottom, and the jacket E, both provided with flanges, whereby they are suspended in the bed-plate $a$, and secured in place by buttons, in combination with the double convex plunger C, as shown and described.

CHARLES ADOLPH FREDERICK.

Witnesses:
MARK HUNT,
PHILIP MAHLER.